United States Patent [19]

Morris

[11] 4,444,403
[45] Apr. 24, 1984

[54] THERMAL AND/OR CORROSION SEAL FOR A WELL TOOL

[75] Inventor: Arthur J. Morris, Magnolia, Tex.

[73] Assignee: Camco, Incorporated, Houston, Tex.

[21] Appl. No.: 390,088

[22] Filed: Jun. 21, 1982

[51] Int. Cl.³ .............................................. F16J 15/06
[52] U.S. Cl. .................................... 277/228; 138/110; 308/4 A
[58] Field of Search ......... 308/4 A; 138/110, DIG. 6, 138/149, 121, 113; 277/227, 228, 229

[56] References Cited

U.S. PATENT DOCUMENTS 1,635,482  7/1927  Joyce ................................... 277/228
3,322,433  5/1967  Rentschler ........................... 277/228
4,330,136  5/1982  Henson ................................ 277/229

Primary Examiner—Robert I. Smith
Attorney, Agent, or Firm—Fulbright & Jaworski

[57] ABSTRACT

A seal on a well tool for sealing off the space between two well members consisting of an encapsulated polyelastic thermal and/or corrosive seal. The seal includes an outer protective layer which physically protects the seal as it is moved into place and set and which is preferably of a plastic. A second pliable layer is encapsulated in the first outer layer and is impervious to well fluids. Preferably the second layer is a corrugated shaped metal layer. A third layer is encapsulated within the second layer and is an elastic material such as an elastomer.

2 Claims, 5 Drawing Figures

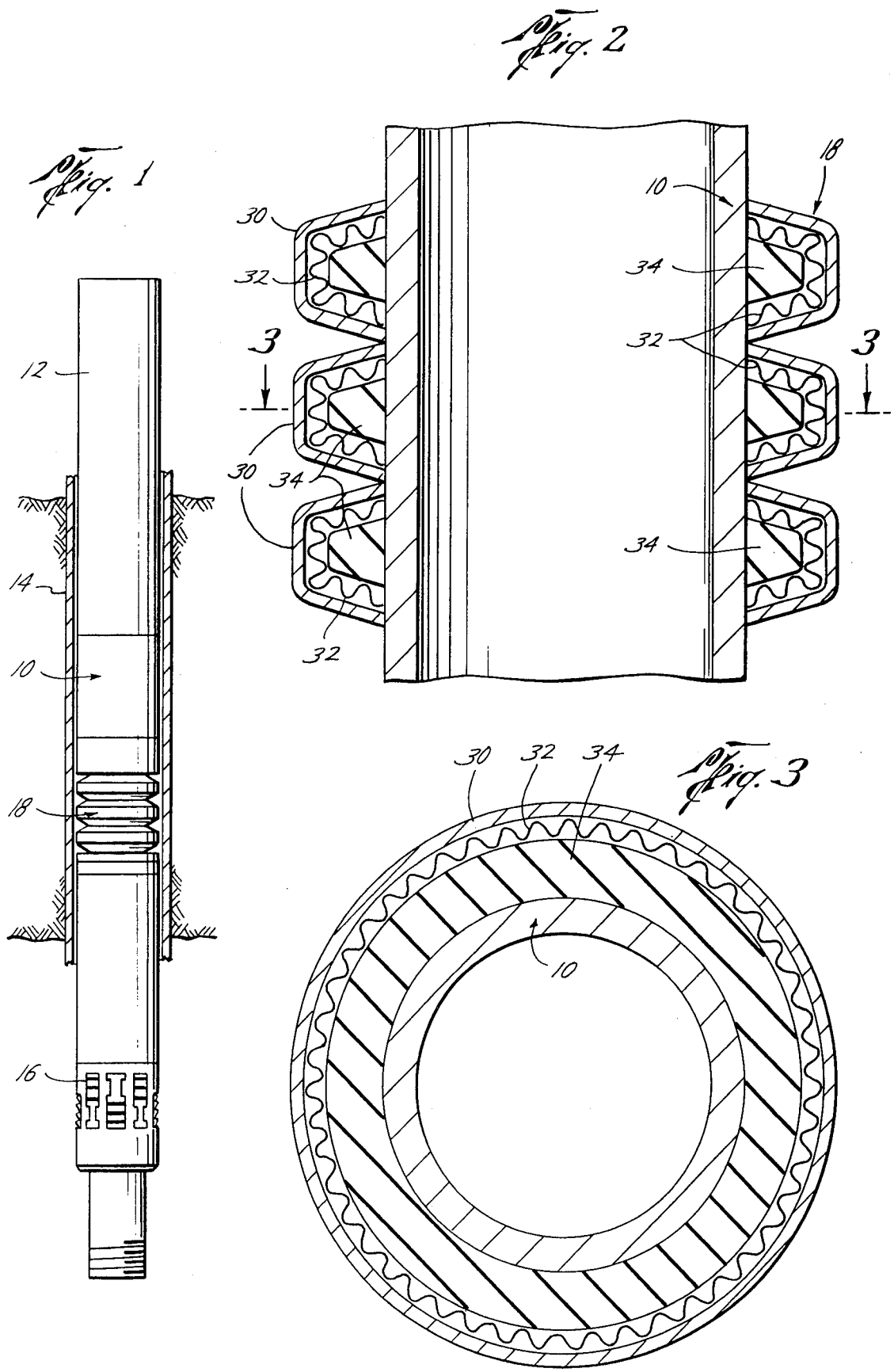

THERMAL AND/OR CORROSION SEAL FOR A WELL TOOL

BACKGROUND OF THE INVENTION

A seal is needed in the oil and gas industry to withstand the high thermal and/or corrosive environment encountered in an oil and gas well operations, including natural and/or stimulated flow. Such a seal is needed on various well tools such as packers, expansion joints and subs. Presently, the existing elastomer compounds are not satisfactory to meet the requirements in many applications such as packing off and isolating the producing interval from the casing annulus. The existing elastomers do not withstand the in situ environments such as high temperatures, high pressure steam, high pressure sour corrosive (such as hydrogen sulfides and carbon dioxide) laden fluids, oil and gas, and salt water and associated chemicals, acids and inhibitors introduced. There are various materials that will solve one problem, but not all combinations. Any seal must have the property of being elastic so as to be able to seal off and hold against the encountered pressures, must be strong and rugged enough to withstand physical contact with well members without being torn or ruptured, and must be impervious and resistive to the various well fluids which are encountered.

The present invention is directed to an encapsulated polyelastic thermal and/or corrosive seal which can be used in a well environment, provide the necessary sealing, and maintain the seal in spite of the adverse variable environments to which it may be exposed.

SUMMARY

The present invention is directed to an improved seal for use in a well tool for sealing off the space between two well members in which the seal is an encapsulated polyelastic thermal and/or corrosive seal. The seal is provided with an outer layer which encapsulates and protects other layers to provide physical protection from damage as the seal is run into a well and/or set. Immediately adjacent and encapsulated within the outer protective layer is a pliable impervious layer such as a metallic and/or plasticelastic material which adds flexibility to the seal but prevents the passage of corrosive well fluids. A seal core is provided which is a third layer encapsulated within the second layer which provides the elasticity and memory that is required to effect a positive seal and while the third layer may not be suitable for exposure to the environment it is protected from the environment by the first and second layers.

Still a further object of the present invention is wherein the outer layer is a suitable plastic and the second layer is a flexible corrugated shaped metal and the third layer is an elastomer.

Still a further object of the present invention is wherein the seal is a plurality of seals which may be of various cross-sectional shapes.

Other and further objects, features and advantages will be apparent from the following description of presently preferred embodiments of the invention, given for the purpose of disclosure and taken in conjunction with the accompanying drawings.

BRIEF DESCRIPTION OF THE DRAWINGS

FIG. 1 is an elevational view of a conventional well packer utilizing the seal of the present invention, FIG. 2 is an enlarged fragmentary view of the well packer of FIG. 1 showing one form of the seal of the present invention, FIG. 3 is a cross-sectional view taken along the line 3—3 of FIG. 2.

DESCRIPTION OF THE PREFERRED EMBODIMENTS

Figure 4:
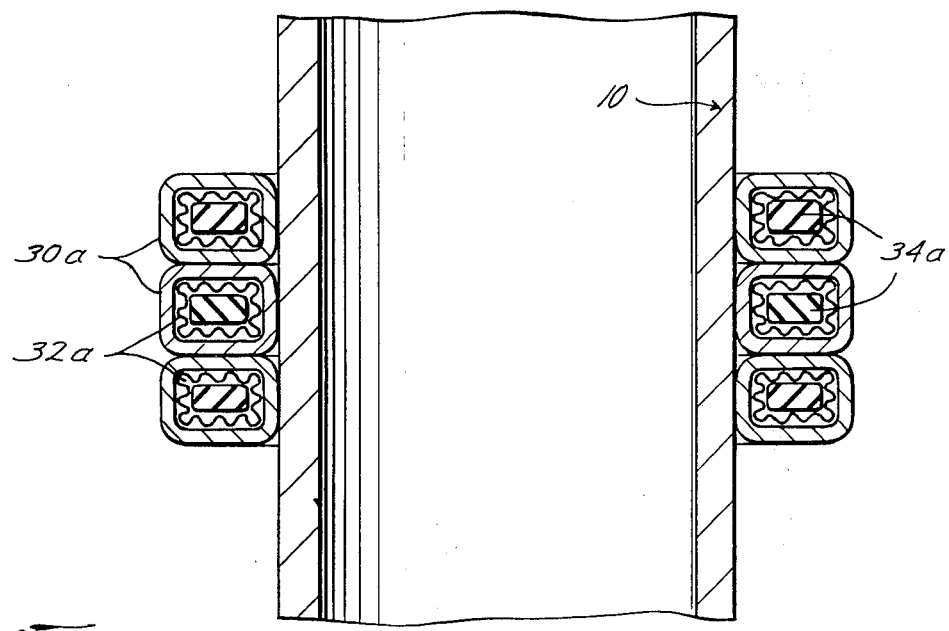
FIG. 4 is a fragmentary cross-sectional view of a differently shaped seal of the present invention.

While the seal of the present invention may be utilized in many and various types of well tools for use in sealing off the space between two well members, the present invention, for purposes of illustration only, will be described in connection with use on a well packer for sealing off the annulus between the well casing and the well tubing.

Referring now to FIG. 1, the reference numeral 10 generally indicates any suitable well packer for connection in a well tubing 12 in a casing 14 in a well. For example, the packer 10 may be an HRP packer manufactured by Camco, Incorporated which is a hydraulically set well packer having slip means 16 for setting in the casing 14 and seal means generally indicated by the reference numeral 18 for packing off the annulus between the tubing 12 and the casing 14. Such well packers are conventional and the present invention is directed to an improved sealing means 18.

Referring now to FIGS. 1, 2 and 3, the preferred embodiment of the sealing assembly 18 is shown which preferably includes a plurality of seals each forming the encapsulated polyelastic thermal and/or corrosive seal of the present invention for withstanding the environmental well fluids such as high temperature/high pressure steam, high temperature sour corrosive (hydrogen sulfide and carbon dioxide) laden produced fluids, whether oil or gas, and the presence of salt water. The seal includes an outer layer 30 which encapsulates and protects inner layers 32 and 34 and which provides the physical strength to protect the layers 32 and 34 from physical abrasion and wear as the packer 10 is moved through and set in the casing 14. The outer layer 30 is a protective and may be an impervious or semi-impervious layer such as a plastic and/or asbestos. Suitable plastics are sold under the trade names of TEFLON, VITON, CALREZ and AFLAS.

The second layer 32 is a pliable, impervious layer, either metallic and/or plastic-elastic which affords protection to the inner most layer 34. The preferred form of the layer 32 is a corrugated or bellows metallic structure such as gold which not having the physical strength of the outer layer 30 is protected by the outer layer 30 and in turn provides the impervious layer for protecting the third layer 34. The third layer 34 consists of a material that affords elasticity and memory but which may not be suitable for exposure to the well fluids and a suitable material is an elastomer. Other suitable materials for the inner core 34 may be materials sold under the trademarks NORDEL, CALREZ, AFLAS and VITON.

Figure 5:
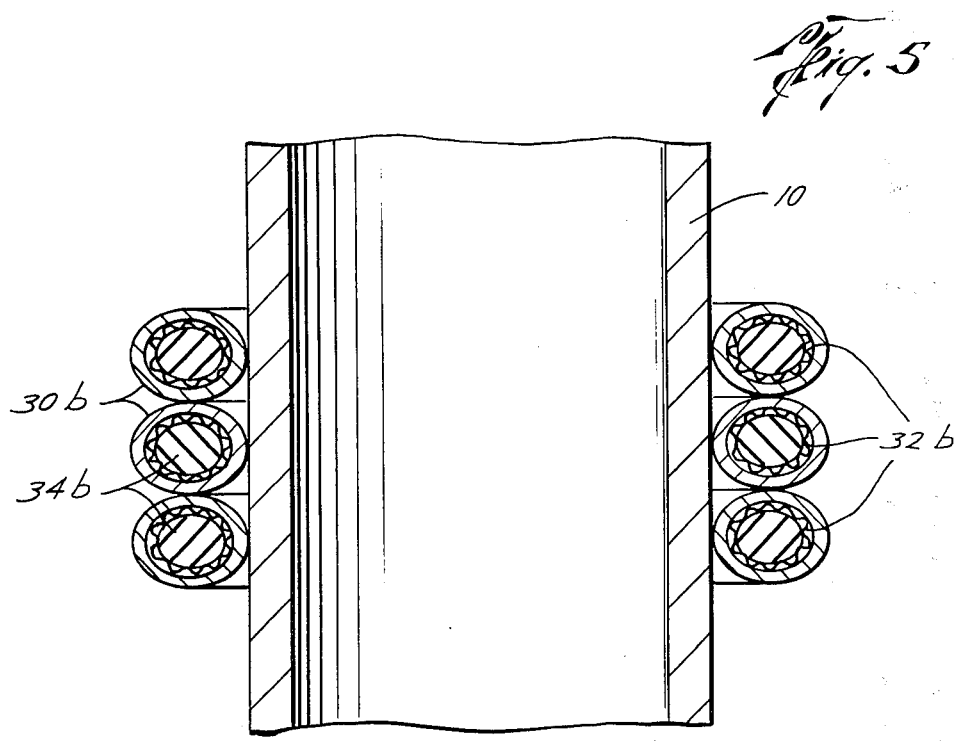
FIG. 5 is a fragmentary cross-sectional view of still a further shaped seal of the present invention.

While the individual seals shown in FIGS. 1-3 are shaped in the form of wedges, other suitable forms may be utilized such as shown in FIGS. 4 and 5 wherein like parts are numbered like those in FIGS. 1-3 but with the addition of the suffixes "a" and "b", respectively. Thus in FIG. 4, the individual seals are rectangularly shaped and in FIG. 5 the individual seals may be oval shaped.

Thus the encapsulated three part seal of the present invention will solve the problems of providing physical strength, and protection, providing chemical protection, but will yet provide a resilient seal which will set and hold the required pressures of the well packer 10.

The present invention, therefore, is well adapted to carry out the objects and attain the ends and advantages mentioned as well as others inherent therein. While presently preferred embodiments of the invention have been given for the purpose of disclosure, numerous changes in the details of construction and arrangement of parts will readily suggest themselves to those skilled in the art and which are encompassed within the spirit of the invention and the scope of the appended claims.

What is claimed is:

1. In a well tool having an expandable seal for sealing off the space between two well members, the improvement in an expandable seal for overcoming high thermal and/or corrosive environments comprising, an outer protective layer, a second pliable layer encapsulated in the outer first layer, said second layer being impervious to well fluids and being a flexible metal, and a third layer encapsulated within the second layer being of an elastic material.

2. In a well tool having an expandable seal for sealing off the space between two well members, the improvement in a seal for overcoming high thermal and/or corrosive environments comprising, an outer protective plastic layer, a second layer encapsulated in the outer layer, said second layer being flexible and impervious to well fluids, said second layer being a corrugated shaped metal, and a third layer encapsulated within the second layer and being of an elastic material.

* * * * *